(12) United States Patent
Brice et al.

(10) Patent No.: US 11,852,119 B2
(45) Date of Patent: Dec. 26, 2023

(54) METHOD FOR CONNECTING A BLADE TO A HUB AND METHOD FOR DISCONNECTING A BLADE FROM A HUB

(71) Applicant: Siemens Gamesa Renewable Energy A/S, Brande (DK)

(72) Inventors: Russell James Brice, Vejle Øst (DK); Jesper Moeller, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/625,479

(22) PCT Filed: Jul. 10, 2020

(86) PCT No.: PCT/EP2020/069573
§ 371 (c)(1),
(2) Date: Jan. 7, 2022

(87) PCT Pub. No.: WO2021/013584
PCT Pub. Date: Jan. 28, 2021

(65) Prior Publication Data
US 2022/0268252 A1    Aug. 25, 2022

(30) Foreign Application Priority Data
Jul. 23, 2019  (EP) ..................................... 19187812

(51) Int. Cl.
*F03D 1/06* (2006.01)
(52) U.S. Cl.
CPC ...... *F03D 1/0658* (2013.01); *F05B 2230/604* (2013.01); *F05B 2230/70* (2013.01)

(58) Field of Classification Search
CPC .... F03D 1/0675; F03D 1/0691; F03D 1/0658; F03D 13/10; F05B 2240/916; F05B 2230/70; F05B 2230/604
See application file for complete search history.

(56) References Cited

U.S. PATENT DOCUMENTS

| | | |
|---|---|---|
| 3,052,396 A1 | 11/2011 | Aloys |
| 2010/0028152 A1 | 2/2010 | Numajiri et al. |
| 2015/0233341 A1 | 8/2015 | Neumann et al. |
| 2016/0040649 A1* | 2/2016 | Smith .................... F03D 13/10 415/121.3 |
| 2017/0067447 A1 | 3/2017 | Reynolds et al. |

FOREIGN PATENT DOCUMENTS

| | | |
|---|---|---|
| GB | 2 483 677 A | 3/2012 |
| WO | 2011/064659 A2 | 6/2011 |

OTHER PUBLICATIONS

International Search Report & Written Opinion for PCT/EP2020/069573 dated Oct. 29, 2020.

* cited by examiner

*Primary Examiner* — Moshe Wilensky
(74) *Attorney, Agent, or Firm* — Schmeiser, Olsen & Watts LLP

(57) ABSTRACT

A method for connecting a blade to a hub of a wind turbine, the method including pulling the blade towards the hub using a rope guided through an interior of the hub is provided. Thus, movements between the hub and the blade, in particular due to oscillations or waves, are reduced during the connection process.

16 Claims, 6 Drawing Sheets

METHOD FOR CONNECTING A BLADE TO A HUB AND METHOD FOR DISCONNECTING A BLADE FROM A HUB

CROSS-REFERENCE TO RELATED APPLICATIONS

This application claims priority to PCT Application No. PCT/EP2020/069573, having a filing date of Jul. 10, 2020, which claims priority to EP Application No. 19187812.3, having a filing date of Jul. 23, 2019, the entire contents both of which are hereby incorporated by reference.

FIELD OF TECHNOLOGY

The following relates to a method for connecting a blade to a hub of a wind turbine. Further, the following relates to a method for disconnecting a blade from a hub of a wind turbine.

BACKGROUND

Wind turbines usually comprise a tower, a nacelle which is mounted to the tower, a hub which is rotatably mounted to the nacelle, and rotor blades which are mounted to the hub.

Modern wind turbine rotor blades are built from fiber-reinforced plastics. A rotor blade typically comprises an airfoil having a rounded leading edge and a sharp trailing edge. The rotor blade is connected with its blade root to the hub of the wind turbine. Further, the rotor blade is connected to the hub by a pitch bearing that allows a pitch movement of the rotor blade.

In many cases, the rotor blades are transported to an erection site of the wind turbine for lifting and mounting the same to the hub once the hub is already mounted to the nacelle at the top of the tower. Therefore, a connection of the blades to the hub is usually made at an elevated height. This usually requires that a crane lifting the blade essentially does not move relative to the hub. Thus, when connecting such a blade offshore, usually a jack up vessel must be provided which provides a rigid connection to the see ground.

SUMMARY

An aspect relates to a method for connecting a blade to a hub, and for disconnecting the same from each other.

Accordingly, a method for connecting a blade to a hub of a wind turbine is provided. The method comprises pulling the blade towards the hub using a rope guided through an interior of the hub.

Therefore, movements between the hub and the blade, in particular due to oscillations or waves, can be reduced during a connecting process. This has the advantage that the blade can be mounted to the hub offshore by a vessel floating in water. Therefore, e.g., providing a jack up vessel can be avoided.

"Rope" means a long element which is configured to transfer pulling forces and which cannot transfer compressive/pushing forces. In particular, the rope is a tension line, a cable, a belt, a chain and/or a wire. In particular, a tension is maintained in the rope. In an embodiment, the rope is pulled from the interior of the hub, in particular by means of a winch or the like. "Guided through the interior of the hub" means that at least one part of the rope is located in the interior of the hub.

A "wind turbine" presently refers to an apparatus converting the wind's kinetic energy into rotational energy, which may again be converted to electrical energy by the apparatus.

According to an embodiment, the method comprises the steps of a) providing the hub which is mounted to a tower of the wind turbine, b) providing the blade and the rope which is connected to the blade with its one end, c) lifting the blade towards the hub, d) placing the other end of the rope into the interior of the hub, e) pulling the rope at the other end, and f) connecting the blade to the hub.

In an embodiment, the rope is connected to a blade root with its one end. In particular, the blade is lifted at a height of the hub in step c). For example, the steps a)-f) are conducted in the listed order. The hub is mounted to a nacelle which is mounted to the tower.

According to a further embodiment, the hub comprises a blade connecting interface which has a hole to the interior of the hub, wherein the rope is placed into the hole in step d).

This has the advantage that the blade can be pulled directly towards the blade connecting interface by the rope. In an embodiment, the hole is a hatch of the hub.

According to a further embodiment, the blade is pulled towards the hub in longitudinal direction of the blade.

This has the advantage that the blade is moved in connecting direction such that connecting means like pins or bolts can engage in respective openings when moving the blade in the same movement direction. In an embodiment, the blade is pulled in horizontal direction. "Longitudinal direction" means a direction pointing from a blade tip towards a radial center of the blade root.

According to a further embodiment, a movement of the blade perpendicular to the longitudinal direction of the blade is restricted by a first guiding element.

This has the advantage that the blade can be hold close enough to the hub during blade connecting procedure even when extensive interference factors due to wind, waves and the like occur. "Perpendicular to the longitudinal direction" means a radial and/or lateral direction.

According to a further embodiment, the first guiding element restricts the movement perpendicular to the longitudinal direction of the blade by engaging in the blade or the hub when the blade is moved towards the hub (first guiding step).

This has the advantage that a reliable restriction of the radial movement can be provided. The first guiding element can be connected to one of the blade root and the hub. The other of the blade root and the hub comprises a receptacle for receiving the first guiding element.

According to a further embodiment, the first guiding element is a guiding cage connected to the hub and protruding from the hub, in particular from the blade connecting surface (20).

In an embodiment the guiding cage is connected to the hub by spring elements. This has the advantage that due to an elasticity of the spring element damage of the blade can be avoided when the blade hits the first guiding element. For example, the spring element may be made of spring steel. The guiding cage may be a grid structure.

According to a further embodiment, the first guiding element has a taper shape.

This has the advantage that fitting the first guiding element into the respective receptacle is facilitated since the taper shape serves as insertion slopes.

According to a further embodiment, a second guiding element restricts the movement perpendicular to the longitudinal direction of the blade by engaging in the first guiding element when the blade is moved towards the hub (second guiding step).

This has the advantage that the movement of the blade relative to the hub can be further restricted. In an embodiment, the second guiding element engages into the first guiding element when the blade is closer to the hub compared to first guiding step. In particular, the second guiding element is fixed to the blade root inside a cavity of the blade root.

According to a further embodiment, the second guiding element comprises a tube connected to the blade, wherein the first guiding element comprises a receptacle for receiving the tube.

This has the advantage that a further mechanical guide is provided which is robust and reliable. In an embodiment, the receptacle is an inverted cone. In an embodiment, the tube protrudes in longitudinal direction of the blade. In particular, the rope may extend through the tube. The tube may also be termed a pipe. The tube or pipe may be formed from a rigid material such as e.g., steel.

According to a further embodiment, the receptacle comprises insertion slopes for centering the second guiding element.

In particular, the insertions slopes guide the second guiding element into an insertion hole of the inverted cone. This has the advantage that the tube can be guided smoothly into the insertion hole.

According to a further embodiment, the movement of the blade perpendicular to the longitudinal direction of the blade relative to the hub is restricted to less than 150 mm, 100 mm or 80 mm by the second guiding element.

This has the advantage that a clearance between the blade and the hub can be maintained small enough facilitating that the connecting steps between the blade and the hub can be made.

"Restricted to less than 150 mm" may mean that a maximum movement distance from one stop to an opposite stop is less than 150 mm.

According to a further embodiment, in step f) a plurality of pins protruding from a blade root are engaged in respective holes provided in the hub.

When the pins penetrate the holes, e.g., the guiding steps are completed and no radial movements of the blade relative to the hub are possible. Therefore, a tight form-fit connection between the blade and the hub is provided. The pins are for example bolts or part of a bolt connection. In an embodiment, the blade and the hub are screwed together.

According to a further embodiment, the rope is connected to the blade inside a cavity in the blade, in particular the blade root.

In an embodiment, the cavity is open and thus accessible. This means that the cavity is penetrated by the first guiding element and that the cavity receives the first guiding element when the blade is moved towards the hub.

According to a further embodiment, the blade is hold by a vessel floating in water.

This has the advantage that a blade connecting process may be conducted without a jack up vessel and, thus, cost-efficient and/or in offshore regions having a great water depth.

Further, a blade for a wind turbine is provided, the blade comprises a blade root and a rope which is connected to the blade root with its one end such that the blade root can be pulled by a free end of the rope.

All embodiments and features explained with reference to the method apply mutatis mutandis to the blade of embodiments of the present invention.

Furthermore, a method for disconnecting a blade from a hub of a wind turbine is provided. The method comprises pulling the blade away from the hub, wherein a rope guided through the interior of the hub maintains a tension between the hub and the blade.

All embodiments and features explained with reference to the method for connecting the blade to the hub apply mutatis mutandis to the method for disconnecting the blade from the hub of embodiments of the present invention.

Further possible implementations or alternative solutions of embodiments of the invention also encompass combinations that are not explicitly mentioned herein of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
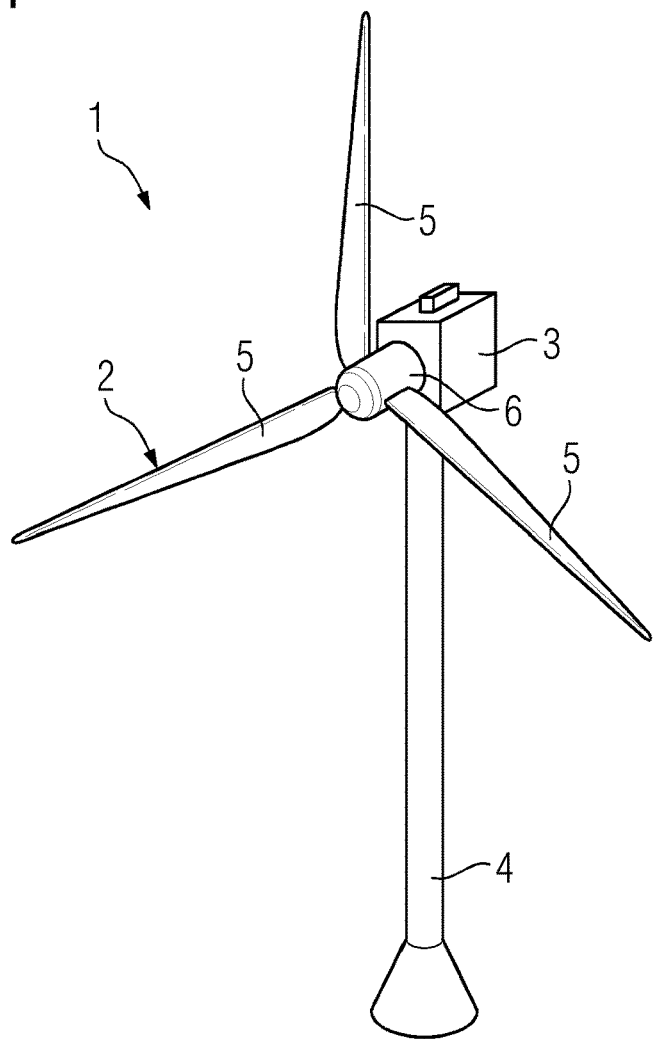
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at an upper end of a tower 4 of the wind turbine 1.

The rotor 2 comprises three blades 5 (i.e., wind turbine blades). The blades 5 are connected to a hub 6 of the wind turbine 1. Rotors 2 of this kind may have diameters ranging from, for example, 30 to 300 meters or even more. The blades 5 are subjected to high wind loads. At the same time, the blades 5 need to be lightweight. For these reasons, blades 5 in modern wind turbines 1 are manufactured from fiber-reinforced composite materials, e.g., by casting. Oftentimes, glass or carbon fibers in the form of unidirectional fiber mats are used. Such blades 5 may also include woods and other reinforcement materials.

Figure 2:
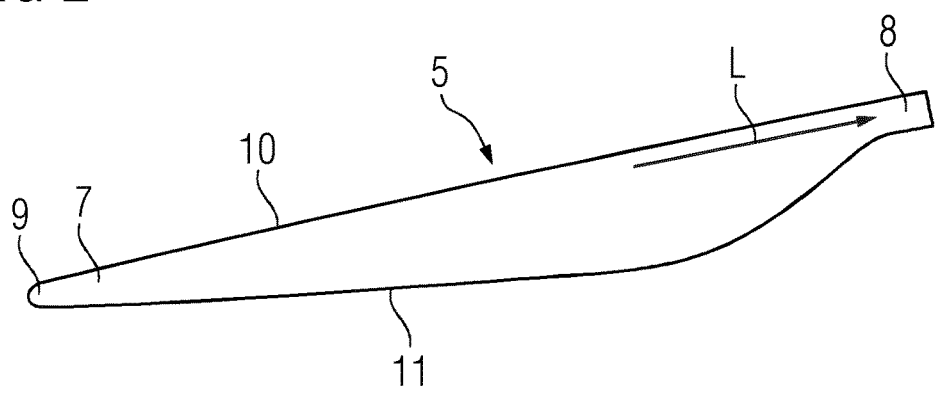
FIG. 2 shows a perspective view of a wind turbine blade of the wind turbine according to FIG. 1.

FIG. 2 shows one blade 5 from FIG. 1. The blade 5 comprises an aerodynamically designed portion 7 which is shaped for optimum exploitation of the wind energy and a blade root 8 for connecting the blade 5 to the hub 6. Further, the blade 5 comprises a blade tip 9 which faces away from the blade root 8. The blade 5 extends in a longitudinal direction L which points from the blade tip 9 towards the blade root 8. The wind turbine blade 5 comprises a leading edge 10 and a trailing edge 11.

Figure 3:
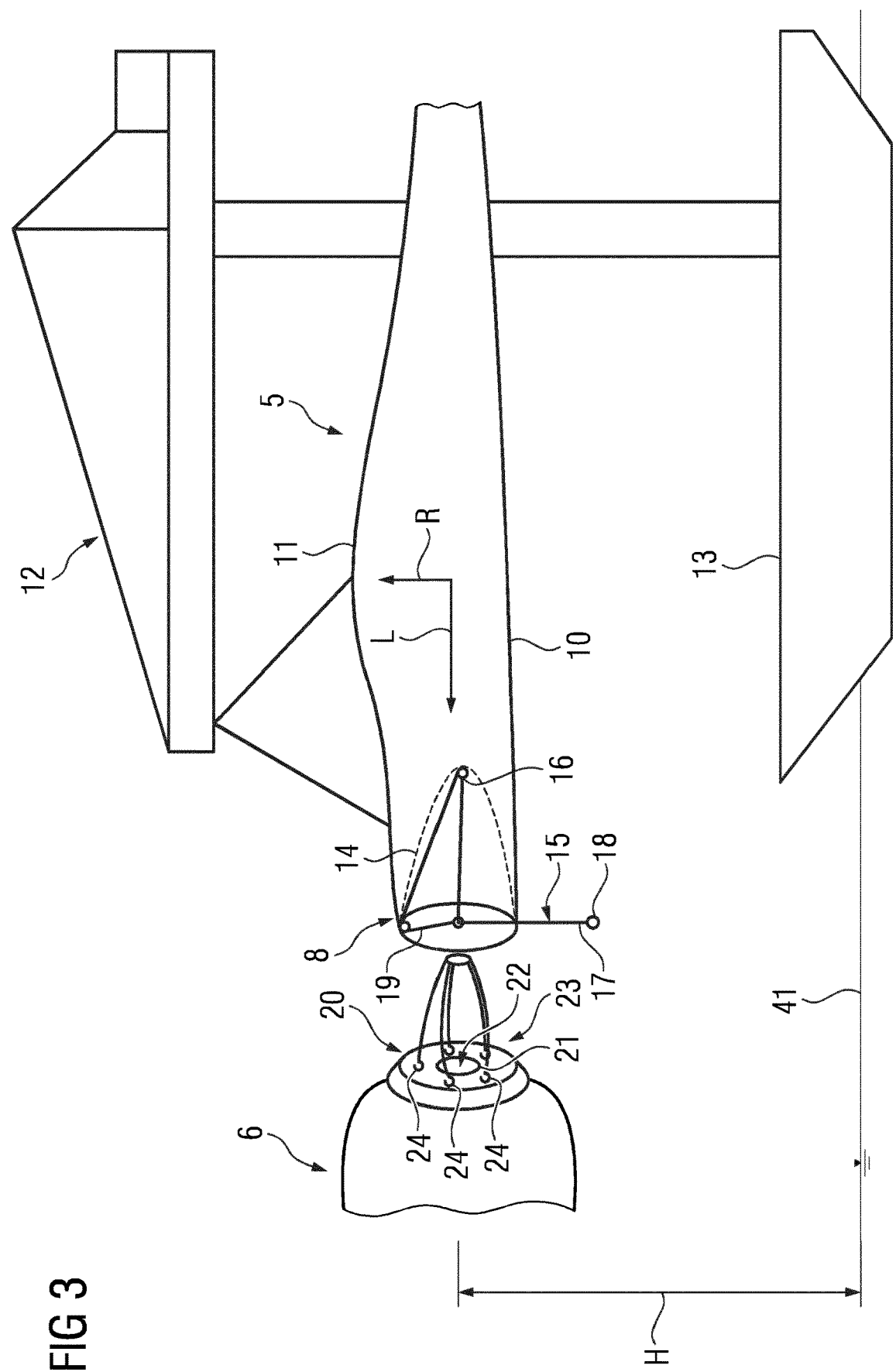
FIG. 3 shows a schematic side view of the blade and the hub before connecting the same together.

FIG. 3 shows a schematical side view of the blade 5 and the hub 6 before connecting the same to each other. The blade 5 is lifted by a crane 12 arranged on a vessel 13. The blade 5 is lifted to the same height H as the hub 6 for connecting the same together. The blade root 8 comprises an open cavity 14 (see broken lines) or an open hollow space. A rope 15 is connected to the blade 5 inside the cavity 14 with its one end 16 such that the blade root 8 can be pulled by a free end 17 of the rope 15. A weight 18 can be provided at the free end 17. The rope 15 can be provided as a tension line. In an embodiment, an auxiliary rope 19 is provided for holding the rope 15 in a central position in the cavity 14.

The hub 6 comprises a blade connecting interface 20 for connecting the bade root 8 thereto. In an embodiment, the hub 6 comprises two further blade connecting interfaces (not shown). The blade connecting interface 20 comprises a hole 21, in particular a hatch, to an interior 22 of the hub 6. Further, a guiding element 23 (also referred as first guiding element) is connected to the blade connecting interface 20.

The guiding element 23 is configured to enter and engage the cavity 14. This means that the cavity 14 receives the guiding element 23 when the blade 5 is moved towards the hub 6. When doing so, a movement perpendicular to the longitudinal direction L, i.e., in radial direction R, of the blade 5 relative to the hub 6 is restricted. The cavity 14 serves as a receptacle for receiving the guiding element 23 forming a form-fit in radial direction R. This has the advantage that a reliable restriction of the radial movement can be provided.

For providing the movement of the blade 5 in longitudinal direction L relative to the hub 6, the free end 17 of the rope 15 is placed through the hole 21 into the interior 22 such that the rope 15 is guided through the interior 22 of the hub 6. The guiding element 23 is e.g., a guiding cage connected to the hub 6 and protruding from the hub 6. The guiding element 23 is connected to the hub 6 by spring elements 24, for example. This has the advantage that due to an elasticity of the spring elements 24 damage of the blade 5 can be avoided when the blade 5 hits the guiding element 23. The guiding element 23 may be a grid structure.

In an embodiment, the guiding element 23 has a taper shape. In particular, the guiding element 23 widens towards the blade connecting interface 20. This has the advantage that fitting the cavity 14 onto the guiding element 23 is facilitated since the taper shape serves as insertion slopes.

Figure 4:
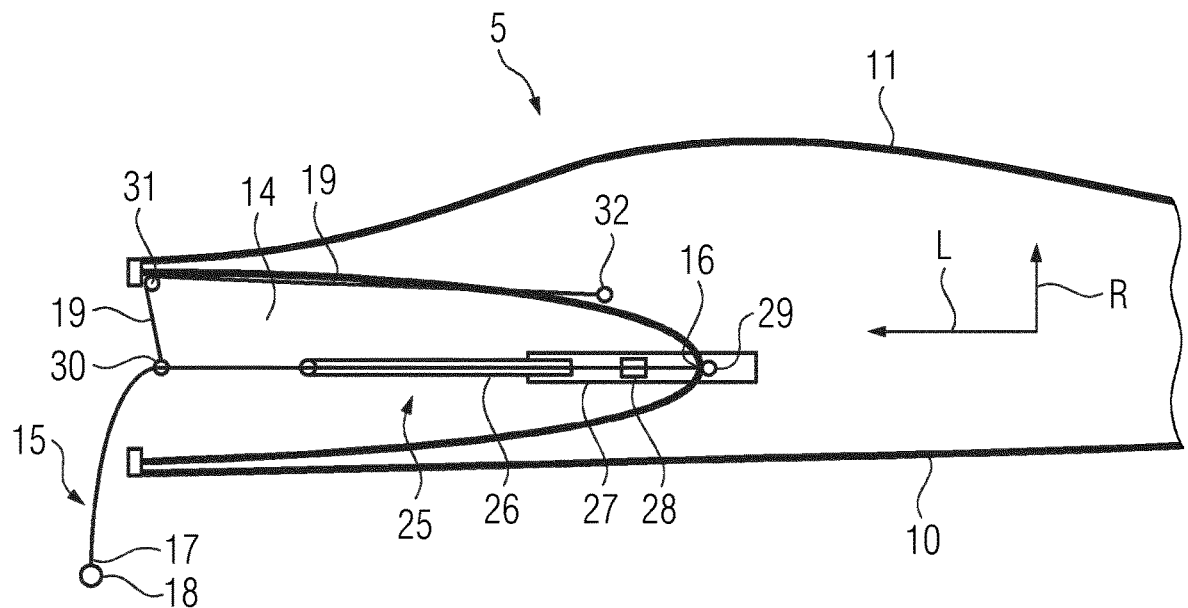
FIG. 4 shows a schematic longitudinal cut through the blade.

FIG. 4 shows a schematical longitudinal cut through the blade 5. A guiding element 25 (also referred as second guiding element) is connected to the blade 5 inside the cavity 14. In an embodiment, the guiding element 25 extends in longitudinal direction L. In particular, the guiding element 25 is a rod and/or probe. The guiding element 25 may have a centered alignment inside the cavity 14.

The guiding element 25 may comprise a hollow element 26, in particular a tube, and a hollow element 27, in particular a tube, slidably supporting the hollow element 26. A sliding movement may be limited by a stop 28 arranged inside the hollow element 27. For example, the rope 15 may extend through the hollow element 26 and the hollow element 27 and may be fixed to the blade 5 or the hollow element 27 by a connecting point 29, in particular anchor point. The hollow element 27 is connected to the blade root 8 inside the cavity 14.

The rope 25 may extend from the guiding element 25 through a ring 30 which is connected to the rope 19 and maintained in a central position inside the cavity 14. The rope 19 is guided through a turning element 31, in particular a guiding roller, and connected to the blade 5 by a connecting point 32, in particular anchor point. The rope 19 may be an elastic line.

Figure 5:
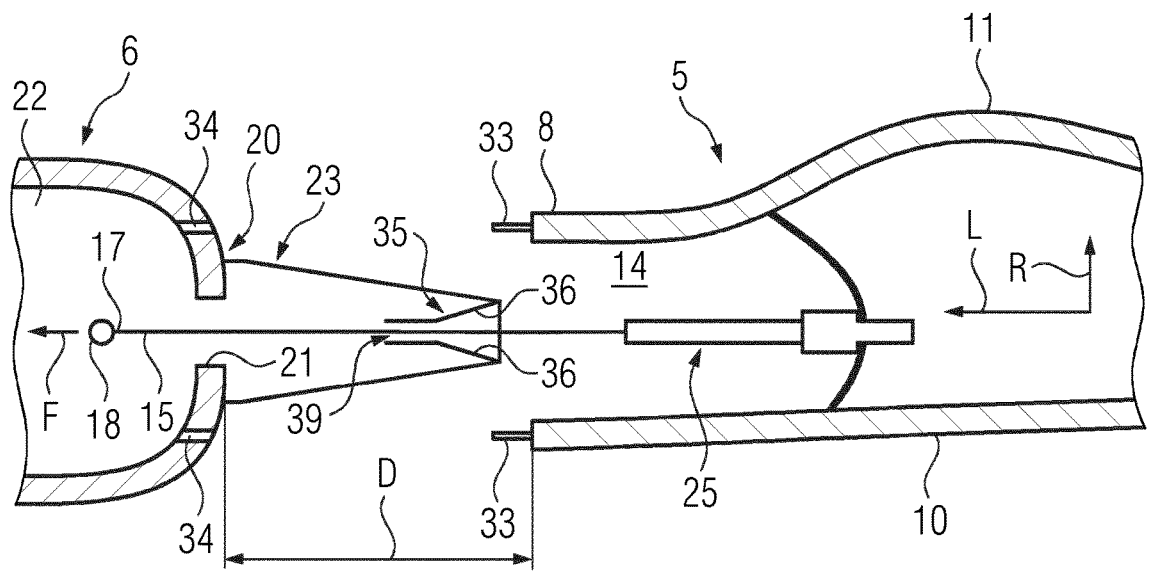
FIG. 5 shows a position of the blade when guided towards the hub.
Figure 6:
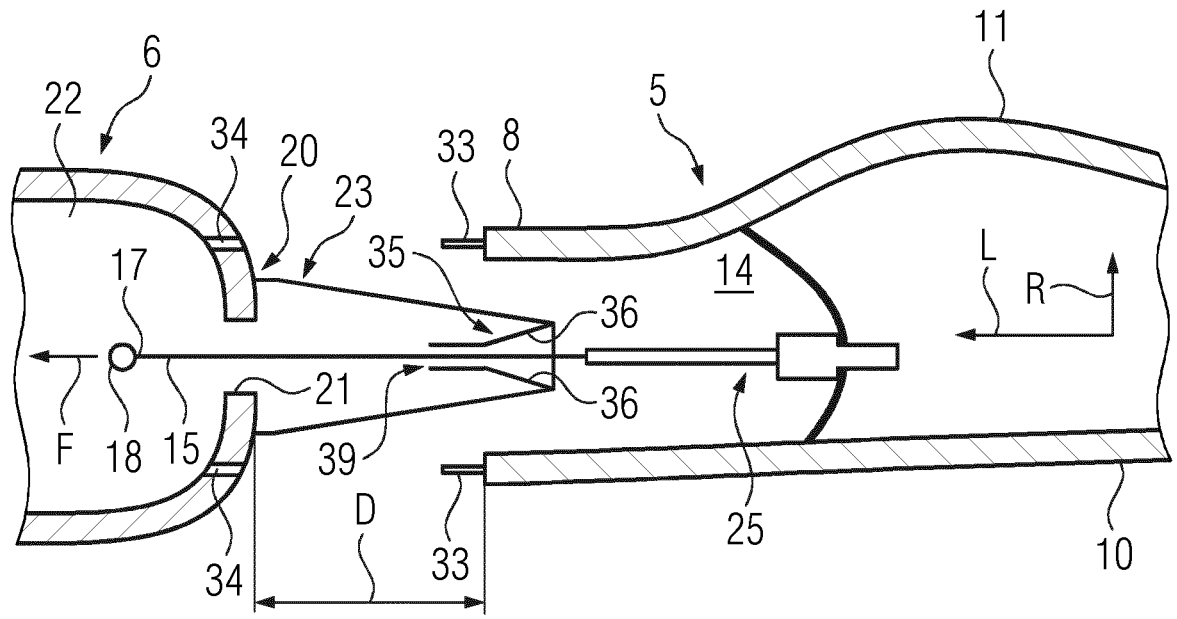
FIG. 6 shows a position of the blade when guided towards the hub with a reduced distance from FIG. 5.
Figure 7:
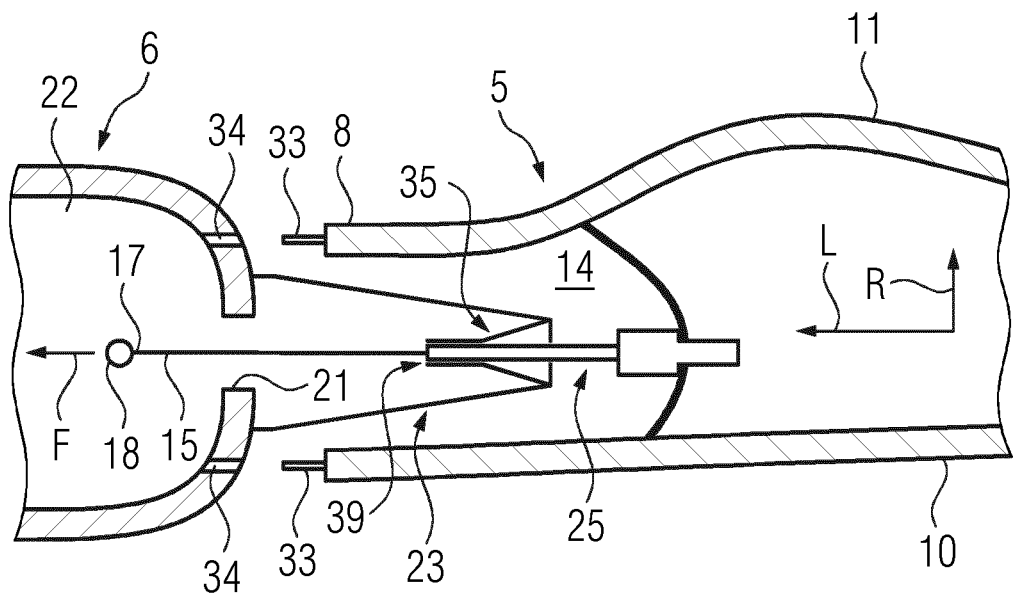
FIG. 7 shows a position of the blade when guided towards the hub with a reduced distance from FIG. 6.

FIGS. 5 to 7 shows different positions of the blade 5 when guided towards the hub 6. The free end 17 of the rope 15 is guided through the interior 22 of the hub 6. A force F pulls at the free end 17 such that the blade root 8 is moved towards the blade connecting interface 20 of the hub 6. The pulling force F may be provided e.g., by a winch (not shown).

Further, a plurality of pins 33, in particular bolts, protruding from the blade root 8 in longitudinal direction L are configured to engage in respective holes 34 provided in the hub 6, in particular the blade connecting interface 20. The guiding element 25 is configured to restrict the movement of the blade 5 in radial direction R by engaging in the guiding element 23, in particular a receptacle 35 in the guiding element 23, when the blade 5 is moved towards the hub 6. This has the advantage that that a further mechanical guide is provided which is robust and reliable. In an embodiment, the receptacle 35 is an inverted cone tapering towards the hub 6.

As shown in FIG. 5 the guiding element 23 does not engage into the cavity 14. When a distance D between the blade connecting interfaced 20 and the blade root 8 is further reduced as shown in FIG. 6 the guiding element 23 engages into the cavity 14 and restricts the relative movement of the blade root 8 in radial direction R. When further reducing the distance D, the guiding element 25 is caught by the receptacle 35 as shown in FIG. 7. The receptacle 35 comprises insertion slopes 36 for catching and centering the guiding element 25. This has the advantage that the movement of the blade root 8 relative to the hub 6 can be further restricted.

For example, the movement of the blade 5 in radial direction R relative to the 6 hub is restricted to less than 150 mm, 100 mm or 80 mm when the guiding element 25 engages in the receptacle 35 (as shown in FIG. 7). This has the advantage that a clearance between the blade 5 and the hub 6 can be maintained small enough for facilitating that the pins 33 can be engaged into the holes 34.

When the pins 33 penetrate the holes 34, e.g., the guiding steps are completed and no radial movements of the blade 5 relative to the hub 6 are possible. Therefore, a tight form-fit connection between the blade 5 and the hub 6 is provided. The pins 33 are for example bolts or part of a bolt connection. In an embodiment, the blade 5 and the hub 6 are screwed together, in particular by the bolts and nuts connected to the bolts (not shown).

Figure 8:
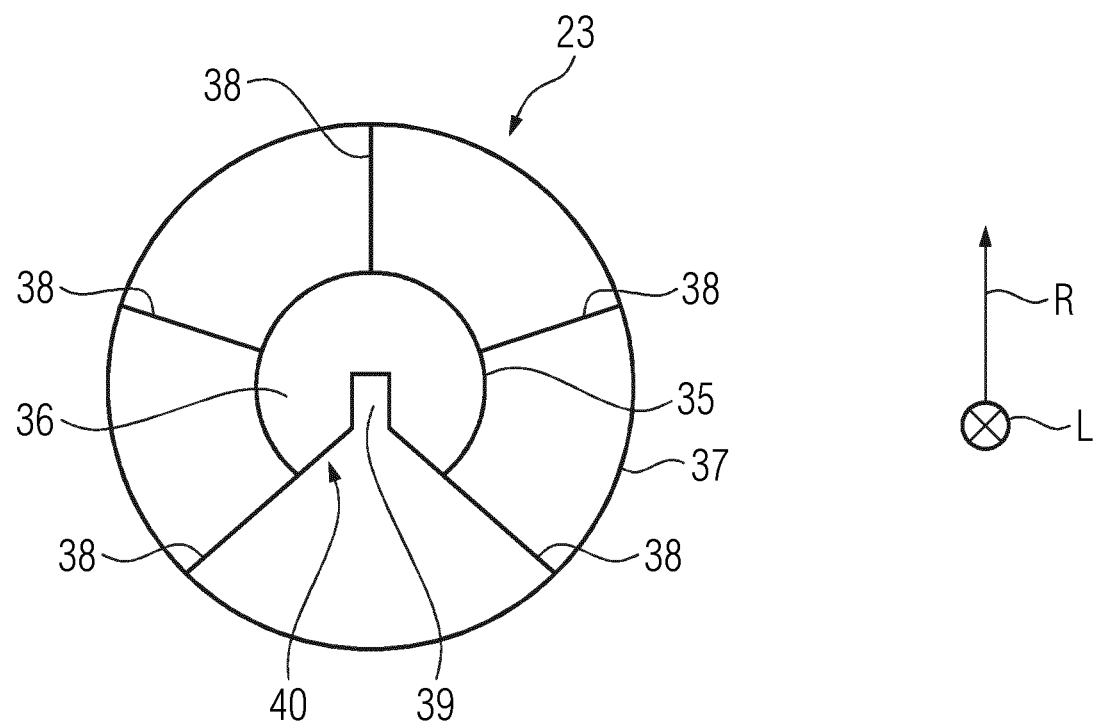
FIG. 8 shows a schematic front view of a guiding element.

FIG. 8 shows a schematical front view of the guiding element 23. The guiding element 23 comprises a circular base portion 37 (e.g., a ring), the receptacle 35 and, in particular fife, guiding portions 38 arranged circular and which connect the receptacle 35 to the base portion 37. The receptacle 35 comprises a central opening 39 (also referred as insertion hole) for being penetrated by the guiding element 25 and for guiding the rope 15. The receptacle 35 has an open section 40 such that the opening 39 is radially assessable.

Figure 9:
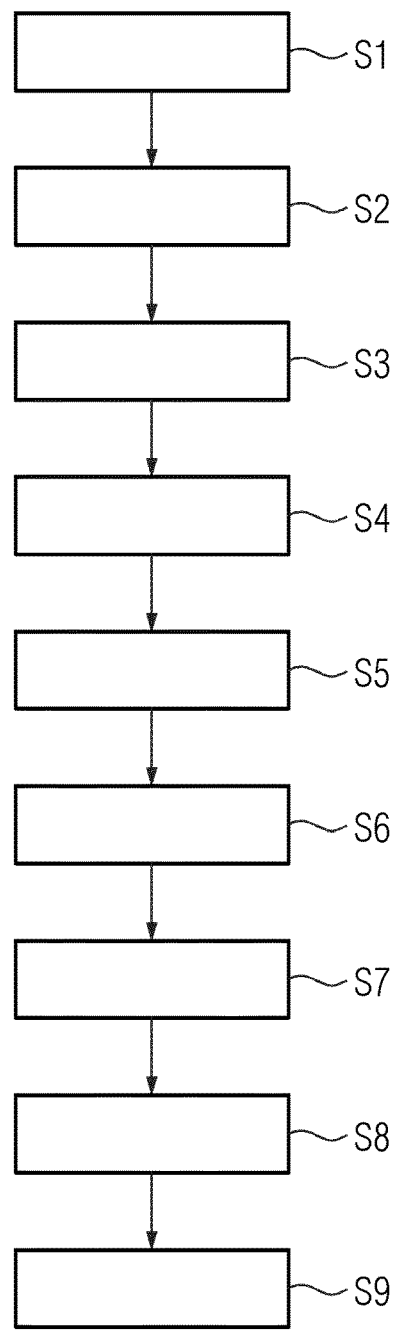
FIG. 9 shows a block diagram of a method for connecting the blade to the hub.

FIG. 9 shows a block diagram of a method for connecting the blade 5 to the hub 6. In step S1 the hub 6 which is mounted to the tower 4 of the wind turbine 1 is provided. In a step S2 the blade 5 and the rope 15 which is connected to the blade 5 with its one end 16 is provided, in particular by the vessel 13. In a step S3 the blade 5 is lifted towards the hub 6, in particular by the crane 12.

In step S4 the other end 17 of the rope 15 is placed into the interior 22 of the hub 6. In a step S5 the blade 5 is pulled towards the hub 6 using the rope 15 guided through the interior 22. In a step S6 the guiding element 23 penetrates the cavity 14 (first guiding step) such that radial movements of the blade root 8 are restricted by a first clearance. In a step S7 the guiding element 25 penetrates the guiding element 23 (second guiding step) such that the radial movements of the blade root 8 are restricted by a second clearance which is less than the first clearance.

Thus, the hub 6 and the blade 5 are brought close enough together by a two-stage physical guide system. In a step S8 the pins 33 penetrate the holes 34. In a step S9 the blade 5 is connected the hub 6 by fixing the same to each other. The step S5 can be conducted time and again during steps S6 to S8. The steps S1 to S9 (e.g., apart from step S5) are conducted in the listed order.

Figure 10:
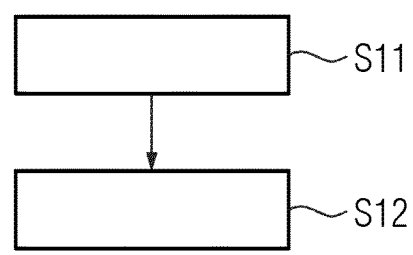
FIG. 10 shows a block diagram of a method for disconnecting the blade from the hub.

FIG. 10 shows a block diagram of a method for disconnecting the blade 5 from the hub 6. The method comprising the step S11 of releasing connecting means 33 between the blade 5 and the hub 6. In a step S12 the blade 5 is pulled away from the hub 5, in particular by the crane 12, wherein a rope 15 guided through the interior 22 of the hub 6 maintains tension between the hub 6 and the blade 5. This has the advantage that the blade 5 cannot slip away from the hub 6. Further, the guiding elements 23, 25 serve as restrictions movements in the radial direction R.

Although embodiments of the present invention have been described in accordance with preferred embodiments, it is obvious for the person skilled in the art that modifications are possible in all embodiments. For example, all features described with reference to the FIGS. 1 to 9 apply mutatis mutandis to a method for disconnecting the blade 5 from the hub 6 shown in FIG. 10 and vice versa.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for connecting a blade to a hub of a wind turbine, the method comprising:
   providing the hub mounted to a tower of the wind turbine;
   providing the blade and a rope connected to the blade at a first end;
   lifting the blade towards the hub;
   guiding a second end of the rope into an interior of the hub;
   pulling the rope at the second end and thereby pulling the blade towards the hub using the rope guided into the interior of the hub; and
   connecting the blade to the hub;
   wherein the blade is pulled towards the hub in a longitudinal direction of the blade,
   wherein a movement of the blade perpendicular to the longitudinal direction of the blade is restricted by a first guiding element,
   wherein the first guiding element is a guiding cage connected to the hub and protruding from the hub, and
   wherein the guiding cage has a grid structure.

2. The method according to claim 1, wherein the hub comprises a blade connecting interface which has a hole to the interior of the hub, and wherein the rope is placed into the hole as part of guiding the second end of the rope into the interior of the hub.

3. The method according to claim 1, wherein the first guiding element restricts the movement perpendicular to the longitudinal direction of the blade by engaging in the blade or the hub when the blade is moved towards the hub.

4. The method according to claim 1, wherein the first guiding element protrudes from the blade connecting surface.

5. The method according to claim 1, wherein the first guiding element has a taper shape.

6. The method according to claim 3, wherein a second guiding element restricts the movement perpendicular to the longitudinal direction of the blade by engaging in the first guiding element when the blade is moved towards the hub.

7. The method according to claim 6, wherein the second guiding element comprises a tube connected to the blade, and wherein the first guiding element comprises a receptacle for receiving the tube.

8. The method according to claim 7, wherein the receptacle comprises insertion slopes for centering the second guiding element.

9. The method according to claim 7, wherein the movement of the blade perpendicular to the longitudinal direction of the blade relative to the hub is restricted to less than 150 mm, 100 mm or 80 mm by the second guiding element.

10. The method according to claim 1, wherein when connecting the blade to the hub a plurality of pins protruding from a blade root are engaged in respective holes provided in the hub.

11. The method according to claim 1, wherein the rope is connected to the blade inside a cavity in the blade.

12. A method for disconnecting a blade from a hub of a wind turbine, the method comprising pulling the blade away from the hub, wherein a rope guided through an interior of the hub maintains a tension between the hub and the blade, wherein a movement of the blade perpendicular to a longitudinal direction of the blade is restricted by a first guiding element for at least a portion of time, wherein the first guiding element is a guiding cage connected to the hub and protruding from the hub, and wherein the guiding cage has a grid structure.

13. A method for connecting a blade to a hub of a wind turbine, the method comprising:
   providing the hub mounted to a tower of the wind turbine;
   providing the blade and a rope connected to the blade at a first end;
   lifting the blade towards the hub;
   guiding a second end of the rope into an interior of the hub;
   pulling the rope at the second end and thereby pulling the blade towards the hub using the rope guided into the interior of the hub; and
   connecting the blade to the hub;
   wherein the blade is pulled towards the hub in a longitudinal direction of the blade,
   wherein a movement of the blade perpendicular to the longitudinal direction of the blade is restricted by a first guiding element and a second guiding element,
   wherein the second guiding element comprises a tube connected to the blade, and
   wherein the first guiding element comprises a receptacle for receiving the tube.

14. The method according to claim 13, wherein the receptacle comprises insertion slopes for centering the second guiding element.

15. The method according to claim 13, wherein the movement of the blade perpendicular to the longitudinal direction of the blade is restricted to less than 150 mm, 100 mm, or 80 mm by the second guiding element.

16. The method according to claim 13, wherein the first guiding element is a guiding cage connected to the hub and protruding from the hub.

* * * * *